US 6,736,448 B2

(12) United States Patent
Hanakawa et al.

(10) Patent No.: US 6,736,448 B2
(45) Date of Patent: May 18, 2004

(54) BODY FRAME STRUCTURE FOR A VEHICLE AND METHOD FOR MANUFACTURING THEREOF

(75) Inventors: Katsunori Hanakawa, Hiroshima (JP); Kyoso Ishida, Hiroshima (JP); Takayuki Sunakawa, Hiroshima (JP); Yukihiro Sugimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/246,774

(22) Filed: Sep. 19, 2002

(65) Prior Publication Data

US 2003/0075951 A1 Apr. 24, 2003

(30) Foreign Application Priority Data

Sep. 21, 2001 (JP) .................................. 2001-288374

(51) Int. Cl.[7] .............................................. B62D 23/00
(52) U.S. Cl. ........................ 296/187.09; 296/193.09; 296/203.02
(58) Field of Search ................. 296/187.01, 187.03, 296/187.09, 187.11, 193.09, 203.01, 203.02, 204, 205; 280/784

(56) References Cited

U.S. PATENT DOCUMENTS

| | | | | |
|---|---|---|---|---|
| 3,638,748 A | * | 2/1972 | Tixier | 180/232 |
| 3,831,997 A | * | 8/1974 | Myers | 296/187.09 |
| 4,194,763 A | * | 3/1980 | Reidelbach et al. | 280/784 |
| 4,428,599 A | * | 1/1984 | Jahnle | 280/784 |
| 4,440,435 A | * | 4/1984 | Norlin | 296/187.09 |
| 4,684,151 A | * | 8/1987 | Drewek | 280/784 |
| 4,702,515 A | * | 10/1987 | Kato et al. | 296/187.01 |
| 5,314,229 A | * | 5/1994 | Matuzawa et al. | 296/187.09 |
| 5,429,388 A | * | 7/1995 | Wheatley et al. | 280/784 |
| 5,431,445 A | * | 7/1995 | Wheatley | 280/784 |
| 5,480,189 A | * | 1/1996 | Davies et al. | 280/797 |
| 5,566,777 A | * | 10/1996 | Trommer et al. | 180/232 |
| 5,660,116 A | * | 8/1997 | Dannawi et al. | 105/392.5 |
| 5,853,195 A | * | 12/1998 | Le et al. | 280/784 |
| 5,876,078 A | * | 3/1999 | Miskech et al. | 293/133 |
| 6,003,934 A | * | 12/1999 | Usui | 296/203.02 |
| 6,131,685 A | * | 10/2000 | Sakamoto et al. | 180/232 |
| 6,193,274 B1 | * | 2/2001 | Brown et al. | 280/784 |
| 6,193,303 B1 | * | 2/2001 | Urushiyama et al. | 296/187.03 |
| 6,286,895 B1 | * | 9/2001 | Urushiyama et al. | 296/187.03 |
| 6,296,300 B1 | * | 10/2001 | Sato | 296/187.08 |
| 6,367,868 B1 | * | 4/2002 | Larsson et al. | 296/187.03 |
| 2002/0029921 A1 | * | 3/2002 | Dau et al. | 180/312 |
| 2003/0011184 A1 | * | 1/2003 | Sonomura et al. | 280/784 |
| 2003/0075377 A1 | * | 4/2003 | Roehringer et al. | 180/312 |

FOREIGN PATENT DOCUMENTS

| | | |
|---|---|---|
| EP | 0 816 520 A2 | 1/1998 |
| JP | 10-17933 A | 1/1998 |
| JP | 2000-53022 A | 2/2000 |

* cited by examiner

*Primary Examiner*—D. Glenn Dayoan
*Assistant Examiner*—Patricia Engle
(74) *Attorney, Agent, or Firm*—Nixon Peabody LLP; Donald R. Studebaker (57) ABSTRACT

A pair of left and right front frames are formed with brittle sections on proximal portions of the frames, by the provision of the smaller cross-sectional area than other sections of the frame. The brittle sections and their peripheral sections are processed so as to become approximately equal to the other sections of the front frames in axial compressive strength by way of a hardening treatment like quenching. In an early-phase of a collision, the hardened brittle sections will not buckle so as to induce larger initial load. Thereafter, the brittle sections will buckle because of their lower ductility, so that the front frames begin bending deformation to effectively absorb the collision energy.

5 Claims, 10 Drawing Sheets

Supply
Drain

BODY FRAME STRUCTURE FOR A VEHICLE AND METHOD FOR MANUFACTURING THEREOF

BACKGROUND OF THE INVENTION

1. Field of the Invention

The present invention relates to a body frame structure for a vehicle which induces larger initial load in a collision and induces the bending deformation in the frame thereafter for effectively absorbing the collision energy with a simple structure and a method for manufacturing thereof.

2. Description of the Related Art

Body frames serving as automotive structural members are indispensably required to not only be excellent in stiffness, but also effective in absorption of energy during an automobile collision. To cope with a frontal collision as a typical example of an automotive collision, an approach to energy absorption has been often attempted which uses a pair of left and right front frames located in front of a passenger compartment and extending in the vehicular longitudinal direction, with axial (or lengthwise) stiffness gradually decreased from a rear section (or passenger-compartment side) towards a frontal section. Thus, in the vehicular frontal collision the front frames fold or are crushed progressively from the frontal section so as to absorb impact load caused by the collision. For different stiffness along the lengthwise of the frames as above, Japanese Patent Publication No. H 10-17933 (equivalent to EP 0 816 520 A2) discloses forming a quenched stratum with predetermined stiffness distribution on the body frames.

Another approach to energy absorption other than the one described above is to control the bending direction of the front frame. For example, Japanese Patent Publication No. 2000-53022 discloses that a beam diagonally extending from a front frame is provided for triggering the bending deformation of the frame in the predetermined direction so as to induce larger collision reaction (or load acting on the body frame in the collision) in an early-phase of the collision, and induce the bending deformation of the body frame after a middle-phase of the collision for absorbing the collision energy. This approach may limit the longitudinal deformation of the front frame to a relatively smaller amount.

In the frame structure disclosed in Japanese Patent Publication No. 2000-53022, however, the beams are required for triggering the bending deformation of the frame, which complicates the construction. In practice, it is therefore important to simplify the structure of the body frame which achieves the preferable impact absorption in such a way as to induce larger collision reaction (or to cause larger initial load) in the early-phase of the collision than in the late-phase of the collision, and to induce the bending deformation in the body frame thereafter within a predetermined limit of the longitudinal deformation of the body frame.

SUMMARY OF THE INVENTION

In view of the aspect above, the first object of the present invention is to provide a body frame structure which induces larger initial load in a collision and induces the bending deformation in the frame thereafter for effectively absorbing the collision energy with a simple structure. The second object of the present invention is to provide a manufacturing method of the body frame used for achieving the object above.

In accordance with a first aspect of the present invention, there is provided a body frame structure for a vehicle, the vehicle including at least one body frame having a brittle section which is formed at a predetermined section in a lengthwise direction relative to the body frame, and is more brittle than another section of the body frame. The brittle section is hardened by a hardening treatment so as to be approximately equal to the other section of the body frame in axial compressive strength.

Accordingly, because the brittle section is approximately equal to the other sections in axial compressive strength, the brittle section will not easily buckle, so as to induce larger collision reaction. Thereafter, the body frame will buckle at the brittle section and bend to effectively absorb the collision energy.

Preferably, the peripheral section and the peripheral section of the brittle section may be hardened by a hardening treatment. Accordingly, the boundaries between the brittle sections and the other sections are prevented from being unexpectedly and locally weakened, so as to reliably induce the buckling at the brittle section.

It is further preferred that the hardening be achieved by a heat treatment. Accordingly, the hardening treatment can be easily achieved by a conventional process.

Still further, it is preferred that the brittle section be achieved by a smaller cross-sectional area than the other sections of the body frame. Accordingly, the brittle section is ensured to be more brittle than other sections.

Moreover, the brittle section may be formed on a planar surface of the body frame. Accordingly, more freedom is available for the location of the brittle section, and the brittle section is easily formed on a planar surface of the body frame because the body frame generally includes a planar surface elongated in a lengthwise direction.

In accordance with a second aspect of the present invention, there is provided a method for manufacturing a body frame for a vehicle which includes the steps of forming a brittle section at a predetermined section in lengthwise direction relative to the body frame, the brittle portion being more brittle than other sections of the body frame, and hardening the brittle section by using a hardening treatment.

Accordingly, a method for manufacturing the body frame used for achieving the first object described above is provided. Preferably, the hardening may be achieved by a heat treatment.

It is further preferred that the peripheral section of the brittle section be hardened by the hardening treatment during the step of performing the hardening.

Still further, it is preferred that the body frame include a predetermined member with the predetermined cross-section formed from at least one sheet metal and the brittle section be simultaneously formed during forming the sheet metal into the predetermined member. Accordingly, the body frame with the brittle section is manufactured by effectively utilizing the existing manufacturing processes.

These and other objects, features, aspects, and advantages of the present invention will become more apparent from the following detailed description of the preferred embodiment relative to the accompanied drawings.

DETAILED DESCRIPTION OF THE INVENTION

Figure 1:
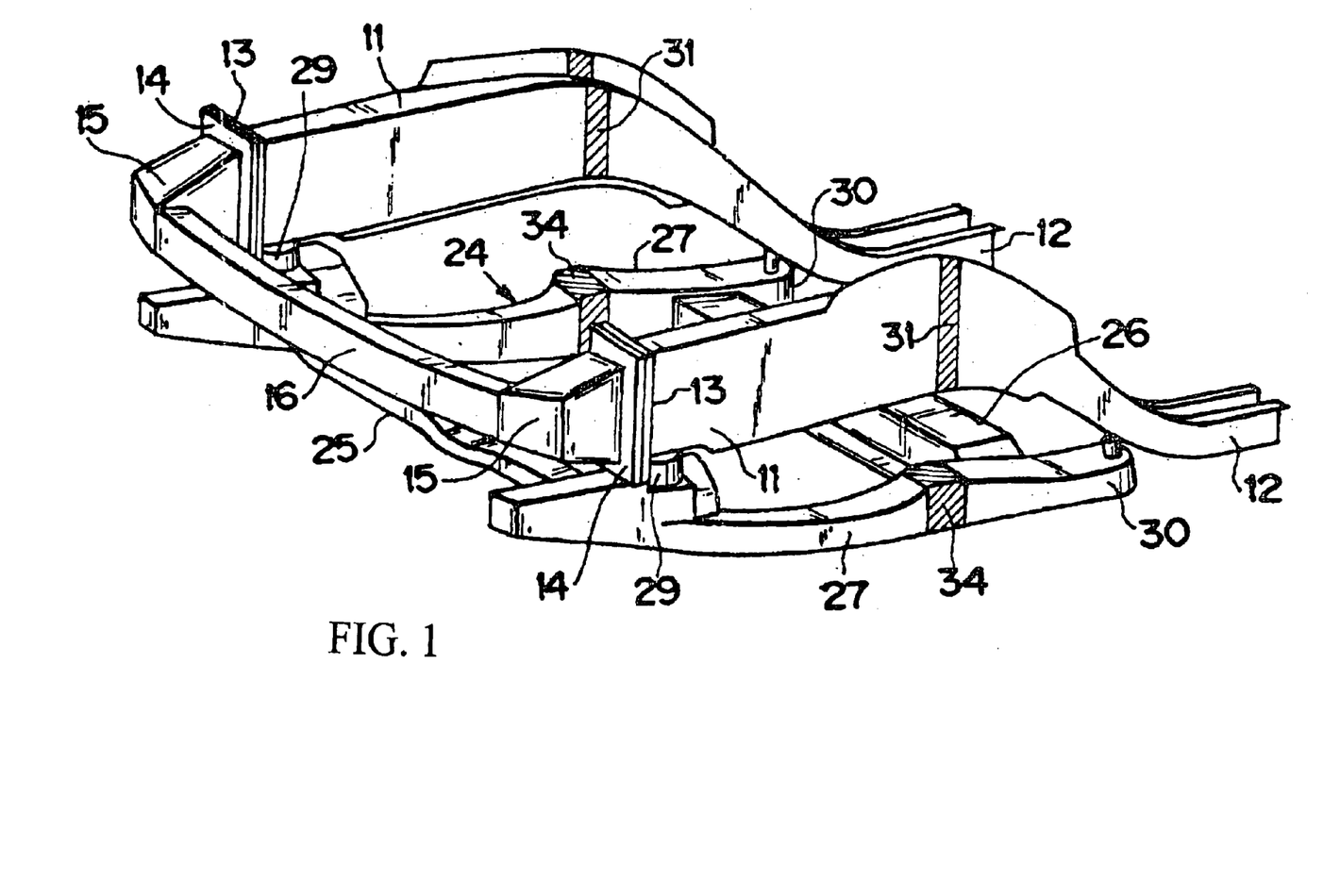
FIG. 1 is a perspective view of a front section of a body in accordance with the present invention.
Figure 2:
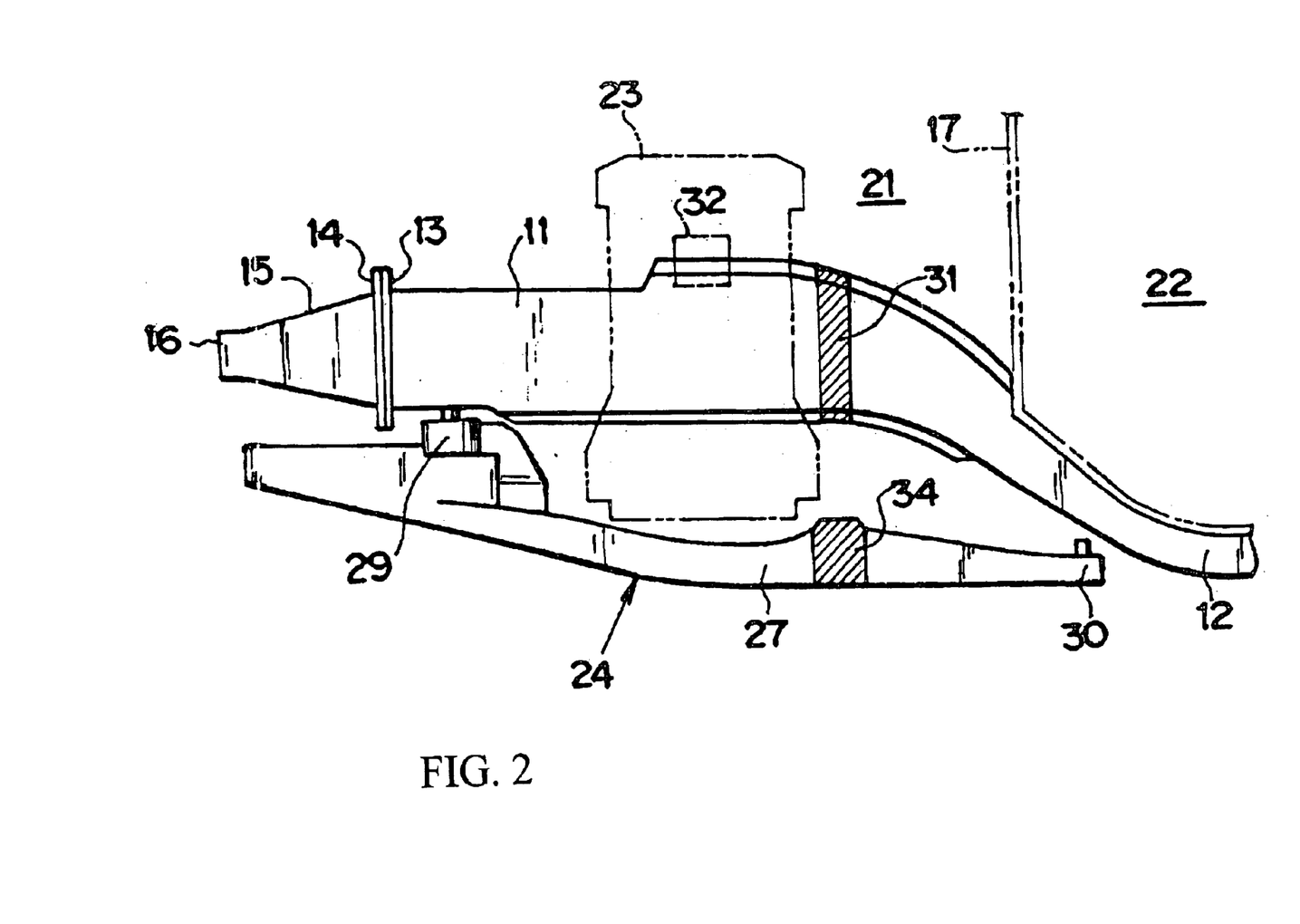
FIG. 2 is a side view of the front section of the body in FIG. 1.
Figure 3:
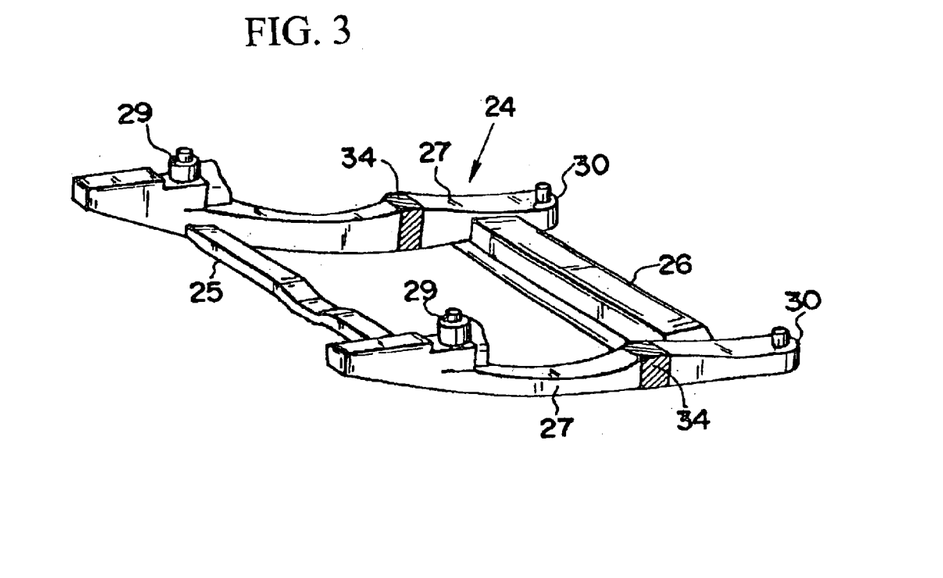
FIG. 3 is a perspective view of a perimeter frame in FIG. 1.

Referring to FIG. 1 to FIG. 3 illustrating a front body structure, identified by 11 is a pair of the left and right front frames (or front side frame) extending in vehicular longitudinal direction and unitarily formed with floor flames 12 at their rear ends.

The front ends of the pair of the left and right front frames 11 are provided with joint flanges 13, respectively. The joint flanges 13 are joined to joint flanges 14 unitarily formed with joint members 15. The left and right joint members 15 are connected to each other by a bumper reinforcement 16 extending laterally.

As shown in FIG. 2, above and rearward of the front frames 11, a dash lower panel 17 is disposed which separates an engine compartment 21 in front and a passenger compartment 22 behind.

The pair of the left and right front frames 11 extend approximately straight from their front ends to a section proximate to the dash lower panel 17, and gradually bend downwardly rearward from the section proximate to the dash panel 17. The front frames 11 are formed to have a closed cross-section.

Below the pair of the front frames 11, a perimeter frame 24 is disposed, the perimeter frame 24 having a rectangular shape as a whole and includes a front member 25 and a rear member 26 both extending laterally, and a pair of the side members 27 extending in the vehicular longitudinal direction and connecting the lateral ends of the members 25 and 26, respectively. The perimeter frame 24 supports at least an engine. In a front-engine front-drive vehicle, the frame 24 supports a transmission device together.

At front and rear end sections of the pair of the left and right side members 27 of the perimeter frame 24, front mount sections 29 and rear mount sections 30 are formed. The front mount sections 29 are mounted on the bottom surface of the front frame 11 thereabove, and the rear mount section 30 are mounted on a dash-lower reinforcement or a torque box on the body. Respective components 25, 26 and 27 of the perimeter frame 24 described above are formed to have a closed cross-section.

At predetermined sections of the pair of the left and right front frame 11, particularly at sections proximate to the dash panel 17 or rear sections of the straight section extending in the vehicular longitudinal direction in this embodiment, brittle sections 31 are formed, the brittle sections 31 being indicated by hatching in FIG. 1 and FIG. 2. The brittle sections 31 are more brittle with smaller cross-sectional area than other portions of the front frames 11 so as to easily induce buckling of the front frame 11 at the brittle sections 31 in a frontal collision. Straight portions extending in the vehicular longitudinal direction of the front frames 11 are approximately constant in cross-sectional area so as to become approximately constant in axial compressive strength over their length, except for the brittle sections 31.

The brittle sections 31 and their peripheral portions are hardened by a hardening treatment such as heat treatment and quenching so as to become approximately equal to the other sections of the front frames 11 in axial compressive strength. The locations of the brittle sections 31 and the detailed process of the hardening treatment will be described below in detail.

Also in the perimeter frame 24, brittle sections 34 are formed on the predetermined sections in lengthwise of the side members 27 for facilitating the buckling. The brittle sections 34 are also hardened by a hardening treatment so as to become approximately equal to the other sections of the side members 27 in axial compressive strength. Straight sections extending in the vehicular longitudinal direction of the side members 27 are approximately constant in cross-sectional area so as to become approximately constant in axial compressive strength over their length, except for the brittle sections 34. A forming process and a hardening-treatment process for the brittle sections 34 are the same as those for the brittle sections 31.

Figure 4:
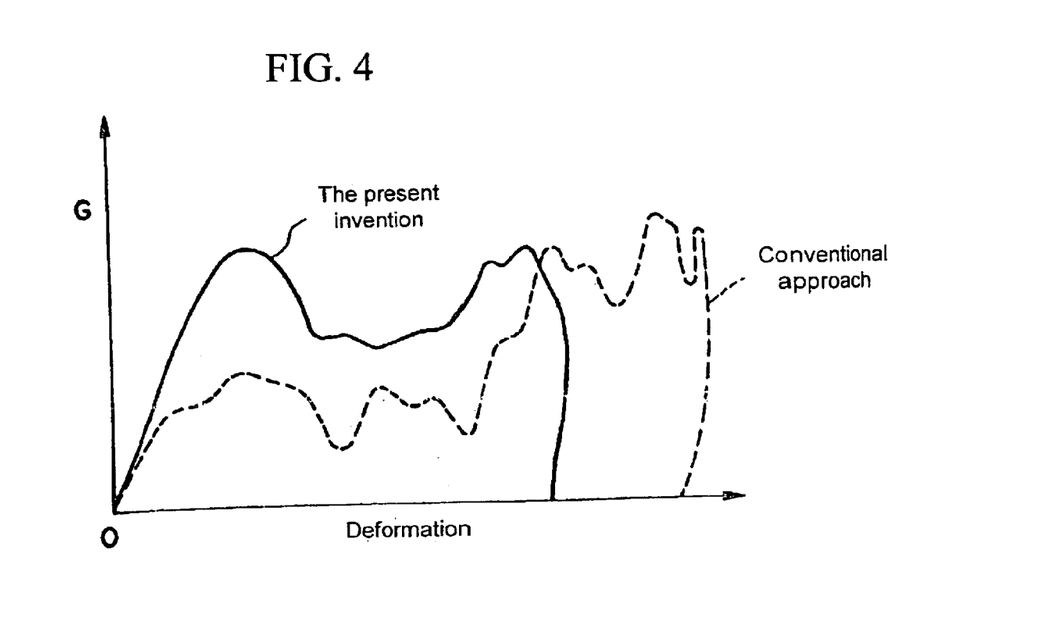
FIG. 4 is a graph chart showing the relationship between the deformation of the front frame and collision reaction for the present invention and for the conventional approach.

A solid line in FIG. 4 indicates the relationship between the deformation of the front frame 11 and collision reaction (or the magnitude of deceleration in the vehicular longitudinal direction) in a vehicular frontal collision, for a vehicle with frames processed and treated as above. As shown, in the early-phase of the collision, the front frame 11 firmly withstands to induce large initial reaction or initial load. That is, the provision of hardening treatment in the brittle section 31 prevents the brittle section 31 from the buckling in the early-phase of the collision to induce larger initial load. On the other hand, the brittle section 31 free from hardening treatment induces the buckling in the early-phase of the collision, which does not provide so large initial load.

Subsequently, the front frame 11 will buckle (because the hardened section is smaller than other portions in ductility)

to deform into a convex shape as a whole with its middle section between its front end section and the brittle section 31 lifted up. This deformation into a convex shape results from the buckling at the brittle section 31 of the front frame 11, and effectively absorbs the collision energy.

A broken line in FIG. 4 indicates the relationship between the deformation of the front frame and collision reaction in a vehicular frontal collision for a conventional approach which absorbs the collision energy by the folding or crushing of the front frame. As shown in the conventional energy absorption, the collision load in the early-phase of the collision is relatively smaller, the collision load in the late-phase of the collision is relatively larger, and the longitudinal deformation of the front frame is considerably larger. In contrast, for the present invention indicated by the solid line in FIG. 4, the collision load in the early-phase of the collision is relatively larger, the collision load in the late-phase of the collision is considerably larger, and the collision load in the middle-phase of the collision is sufficiently larger than the conventional case though not as large as those in the early-phase and the late-phase, which results in smaller longitudinal deformation of the front frame 11 than that in the conventional case. Thus, the front frame 11 of the present invention limits its longitudinal deformation to a small amount and keeps the collision load constant as possible with respect to time period after initiation of the collision, so as to effectively absorb the collision energy as a whole. In FIG. 4, the areas defined by the solid line and the broken line are the total amount of the absorbed energy by the deformation of the front frame 11, respectively.

The pair of the left and right side members 27 of the perimeter frame 24 deforms in substantially the same way as the front frame 11 to absorb the collision energy. That is, the large collision load is induced without the buckling of the brittle section 34 in the early-phase of the collision, and the side member 27 buckles at the brittle section 34 thereafter to deform into a concave shape as a whole with its middle section in a lengthwise direction depressed downwardly so as to effectively absorb the collision energy.

Figure 5:
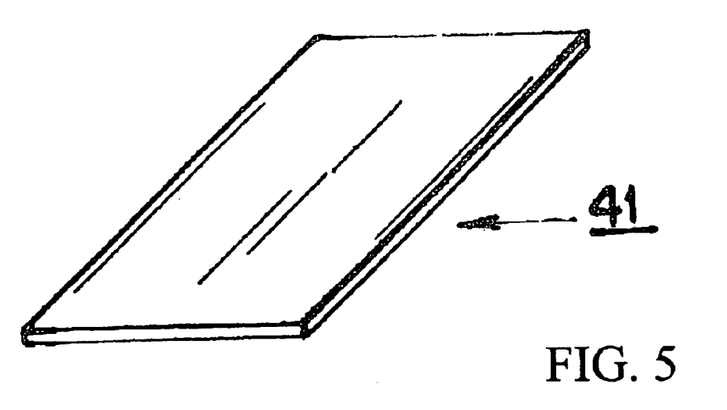
FIG. 5 is a fragmentary perspective view of a sheet metal before the sheet metal is processed into a preliminary preform in accordance with a first embodiment.

Hereinafter, a process for forming the brittle section 31 on the front frame 11 and a process of a hardening treatment will be described by way of example with reference to FIG. 5 to FIG. 9. The drawings show only the brittle section 31 and its peripheral section of the front frame 11. Firstly, as shown in FIG. 5, a first member as a part of the front frame 11 is prepared, which is still a planar sheet-metal 41 (of a steel sheet-metal, usually). The sheet metal 41 is pressed into a preliminary preform 42 with a cross-section shown in FIG. 6. As shown, the cross-section is an outwardly-flanged U-shape. A pair of flanges 42a and a recess as the brittle section 31 are formed during the pressing process simultaneously. The brittle section 31 is formed on a planar surface of the preform 42.

Figure 6:
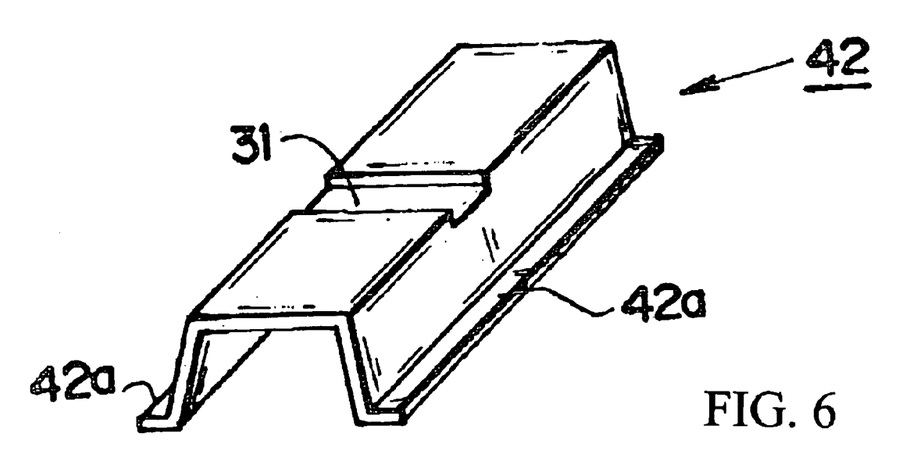
FIG. 6 is a fragmentary perspective view of a preliminary preform in accordance with the first embodiment.
Figure 7:
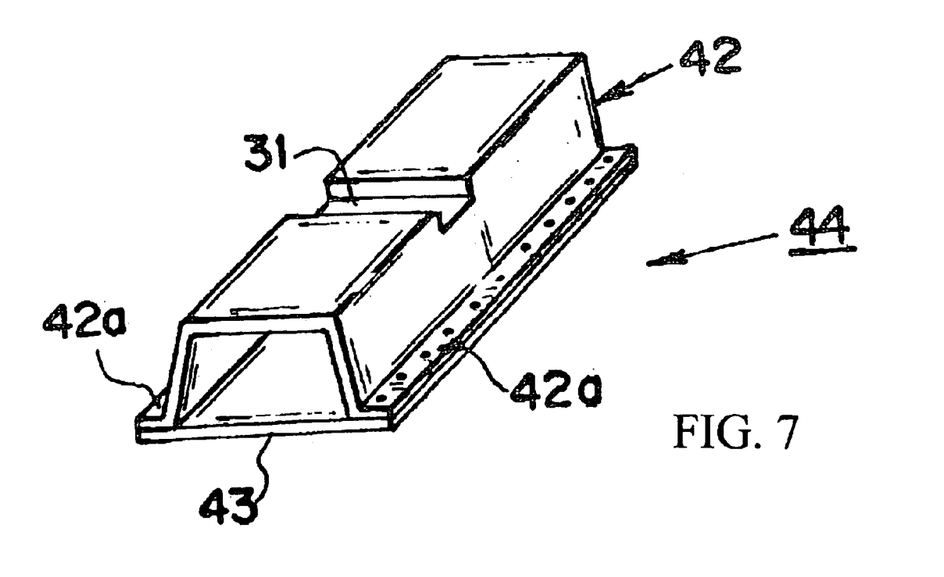
FIG. 7 is a fragmentary perspective view of a secondary preform in accordance with the first embodiment.
Figure 8:
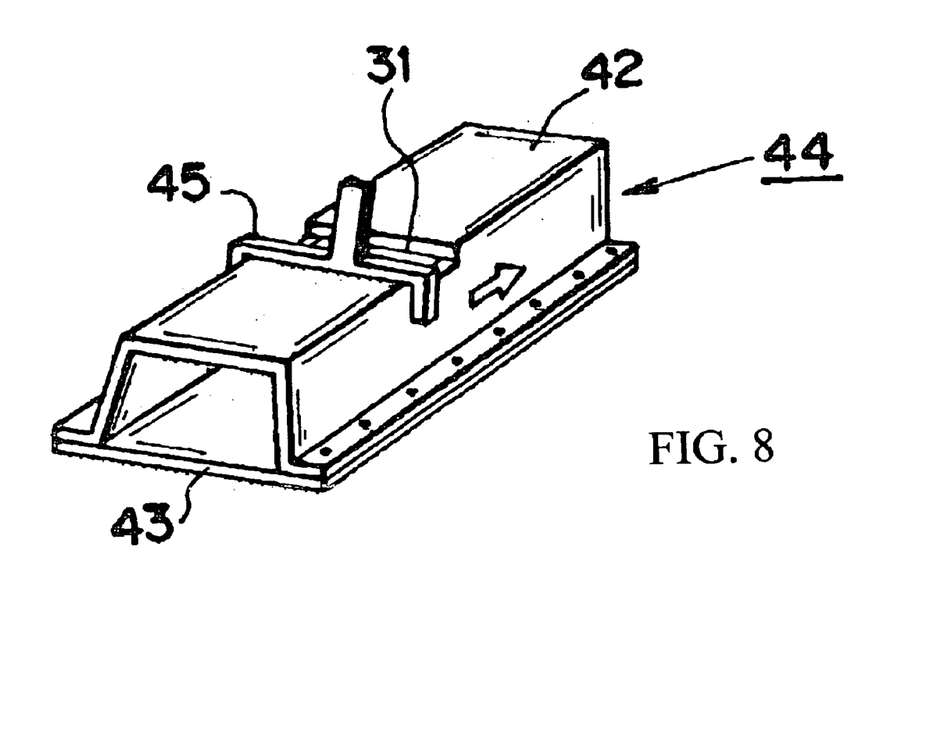
FIG. 8 is a fragmentary perspective view of the secondary preform during the hardening treatment in accordance with the first embodiment.
Figure 9:
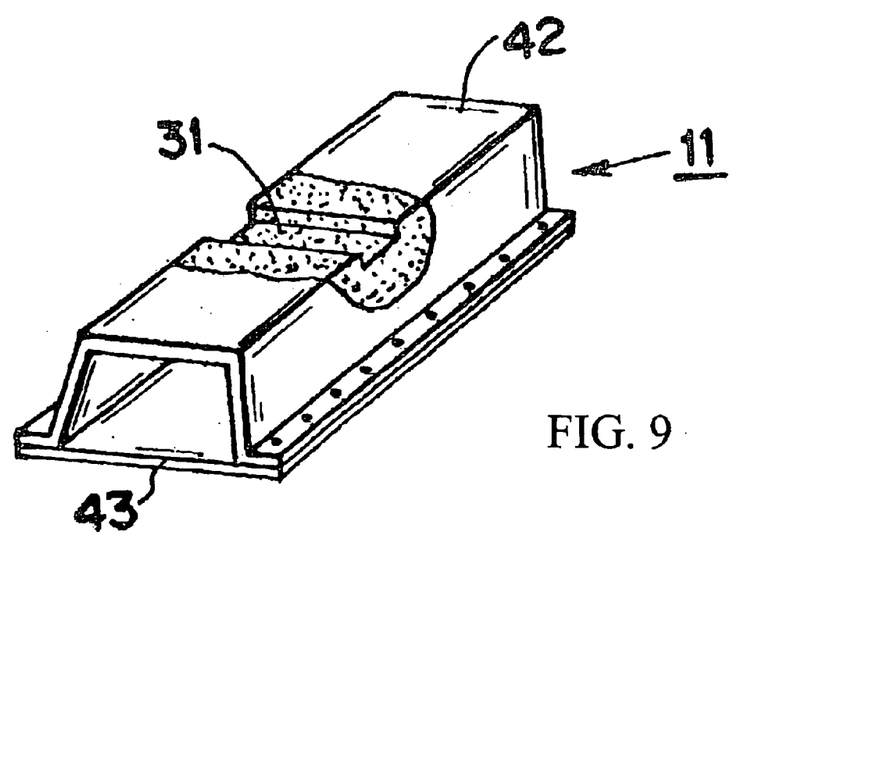
FIG. 9 is a fragmentary perspective view of a front frame provided with the brittle section and hardened by the hardening treatment in accordance with the first embodiment.

Next, as shown in FIG. 7, the preform 42 shown in FIG. 6 are joined with a sheet metal 43 (of a steel sheet-metal, usually) as a second member at the flanges 42a to form a secondary preform 44 with a closed cross-section. Then, as shown in FIG. 8, the brittle section 31 and its peripheral section of the secondary preform 44 are heated by an induction-quenching coil 45, and cooled with cooling water. Here, as shown in FIG. 9, the front frame 11 provided with the brittle section 31 and hardened by the hardening treatment has been prepared. The hardened sections are indicated by hatching.

Figure 10:
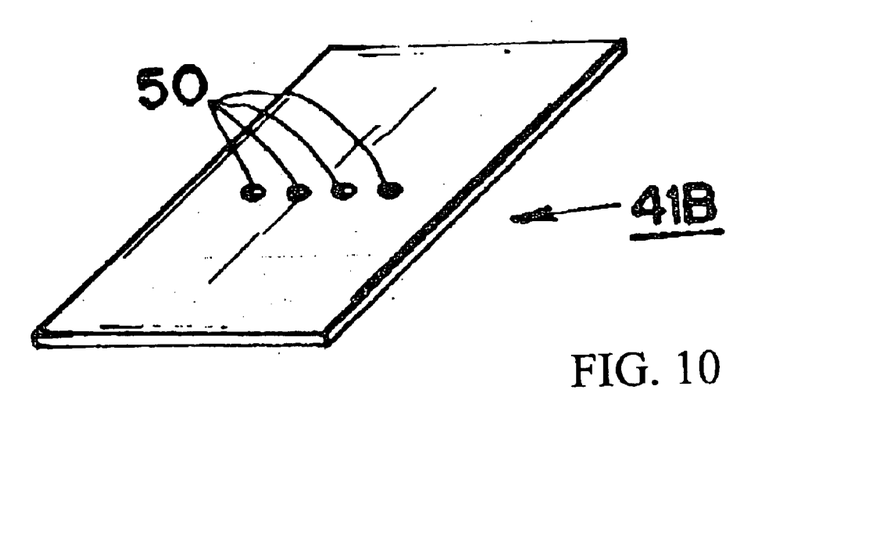
FIG. 10 is a fragmentary perspective view of a preparatory workpiece in accordance with a second embodiment.
Figure 11:
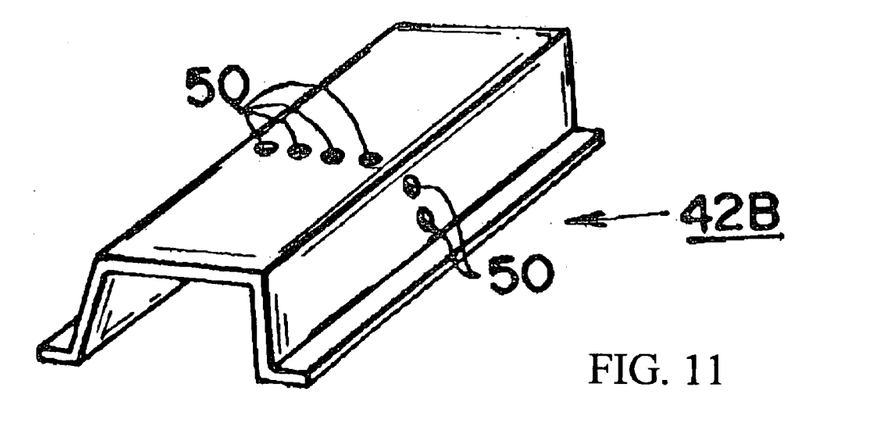
FIG. 11 is a fragmentary perspective view of a preliminary preform in accordance with the second embodiment.
Figure 12:
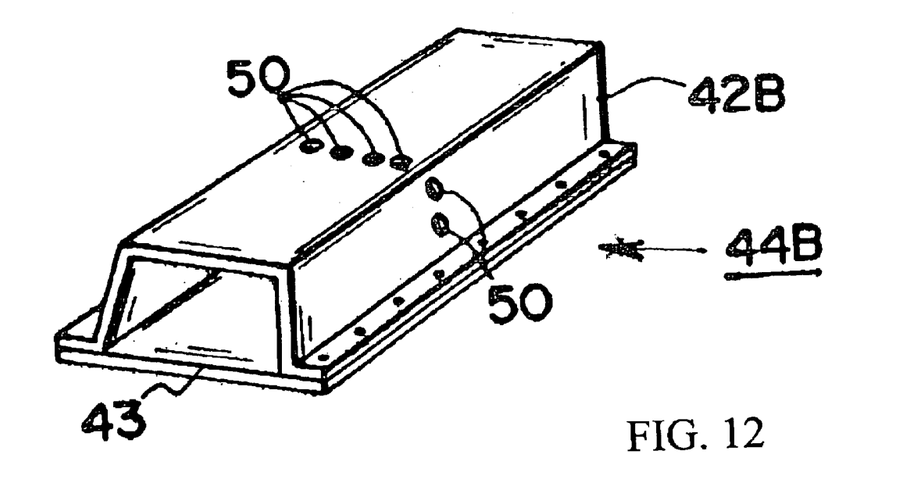
FIG. 12 is a fragmentary perspective view of a secondary preform in accordance with the second embodiment.
Figure 13:
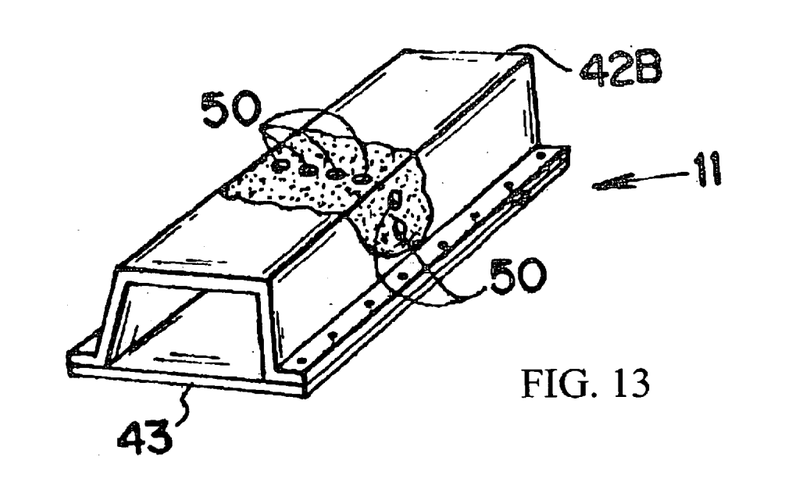
FIG. 13 is a fragmentary perspective view of a finished article of the front frame in accordance with the second embodiment.

FIG. 10 to FIG. 13 show another example of the forming process for the brittle section 31. In this example, as shown in FIG. 10, the sheet metal 41 shown in FIG. 5 is formed with a plurality of perforations 50 at the section corresponding to the brittle section 31 by a preliminary treatment, or a pressing process for example, for preparing a preparatory workpiece 41B. Then, as shown in FIG. 11, the preparatory workpiece 41B is subjected to a pressing process to form a preliminary preform 42B corresponding to the preform shown in FIG. 6. Subsequently, the preliminary preform 42B is joined to a sheet metal 43 as a second member to form a secondary preform 44B shown in FIG. 12, and a plurality of perforations corresponding to the brittle section 31 and their peripheral section are heated and cooled during a quenching treatment. Here, as shown in FIG. 13, a finished article of the front frame 11 hardened by the hardening treatment has been prepared. The hardened sections are indicated by hatching in FIG. 13.

Figure 14:
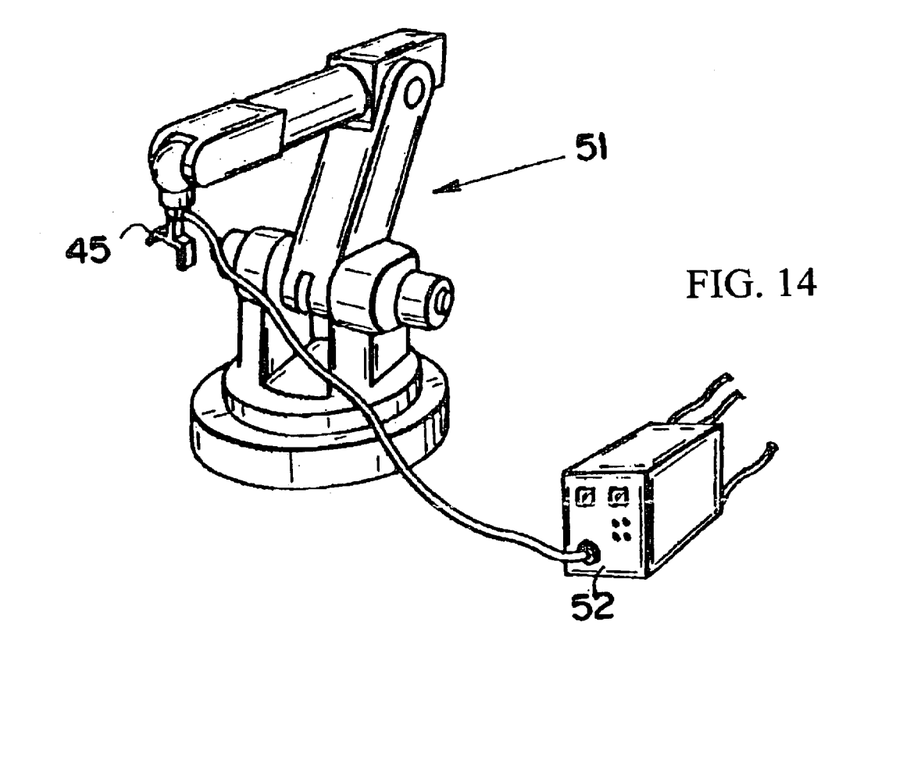
FIG. 14 is a perspective view of a processing machine used for the hardening treatment.
Figure 15:
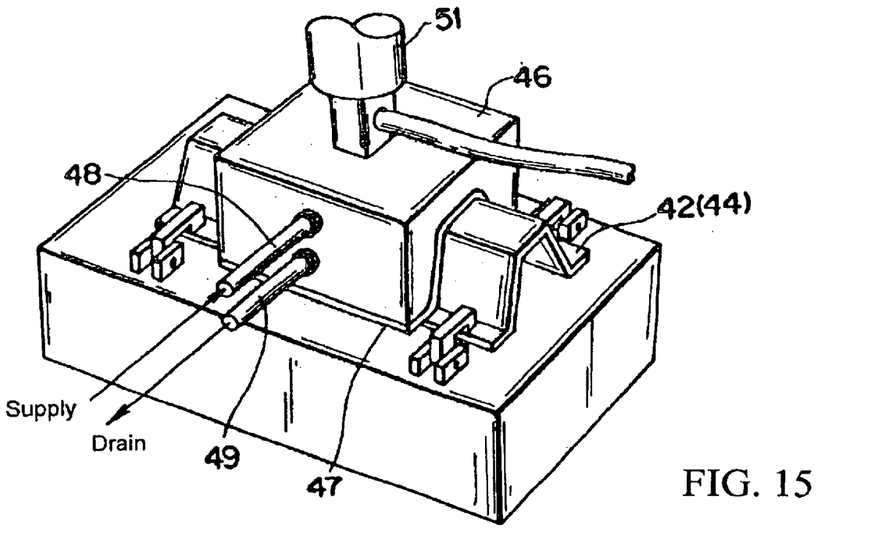
FIG. 15 is a fragmentary perspective view illustrating a hardening treatment by use of the processing machine of FIG. 14.

FIG. 14 to FIG. 17 show an example of a heat treatment as a hardening treatment by use of a processing machine. As shown, the machine 51 is provided with an induction-quenching coil 45 at a tip of arm thereof, and a chamber 46 enclosing the coil 45 (FIG. 14 omits the chamber 46). Identified by 52 in FIG. 14 is a source of high frequency waves. The chamber 46 opens downwardly, with a seal 47 over the opening edge. As shown in FIG. 15, the chamber 46 has a water-supply hose 48 and a drainage hose 49 connected therewith.

Figure 16:
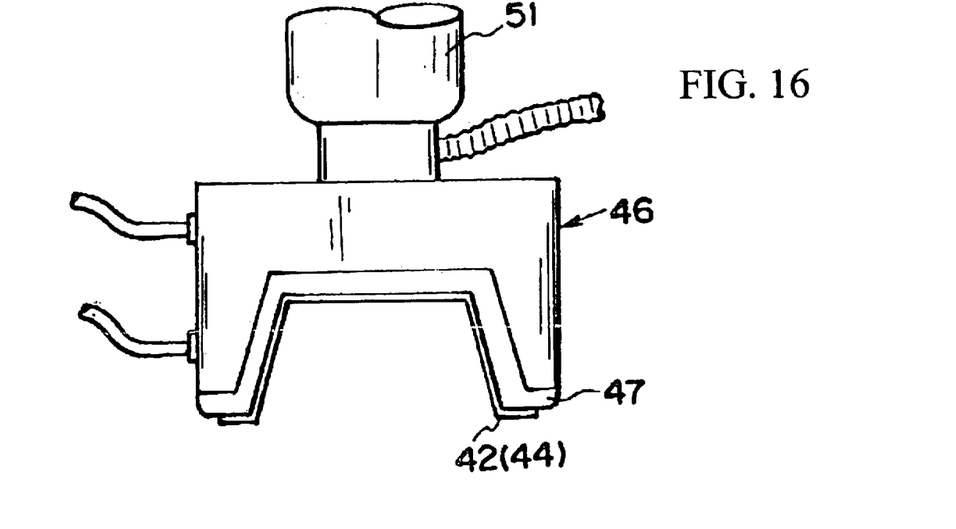
FIG. 16 is an elevational view of the frame and the machine during the hardening treatment.

In the hardening process, firstly, the equipment 51 moves the chamber 46 to a location where the chamber encloses the whole of the brittle section 31 and its peripheral section, as shown in FIG. 15 and FIG. 16. At this time, the seal 47 seals up the inside of the chamber 46 watertightly.

Figure 17:
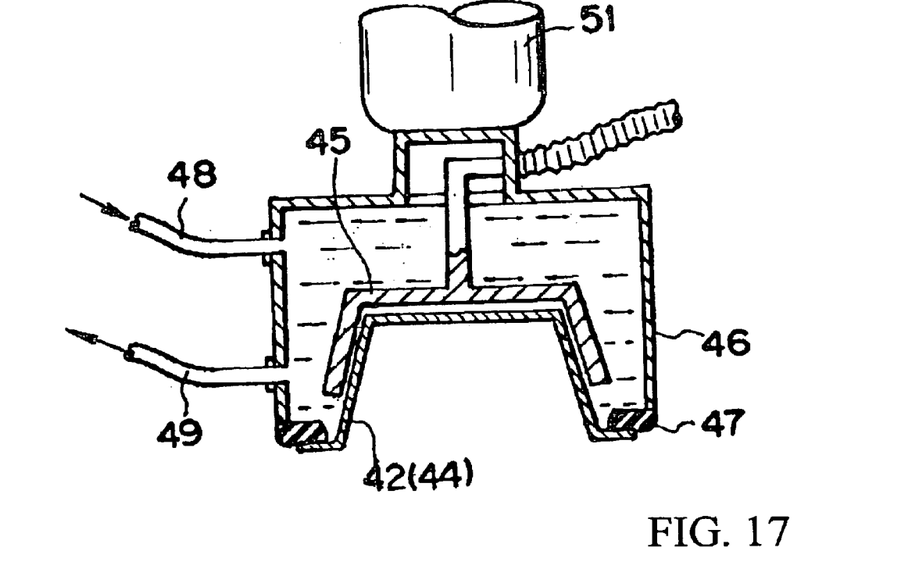
FIG. 17 is a cross-sectional view of the frame and the machine during the hardening treatment, including a coil.

With the brittle section 31 sealed up by the chamber 46 watertightly, cooling water is supplied into the chamber 46, and the coil 45 is energized to heat the brittle section 31 and its peripheral section in the water (that is, water quenching is performed), as shown in FIG. 17. Here, the hardening treatment has been completed. Thereafter, the cooling water is drained from the chamber 46, and then the chamber 46 is removed from the brittle section 31.

Figure 18:
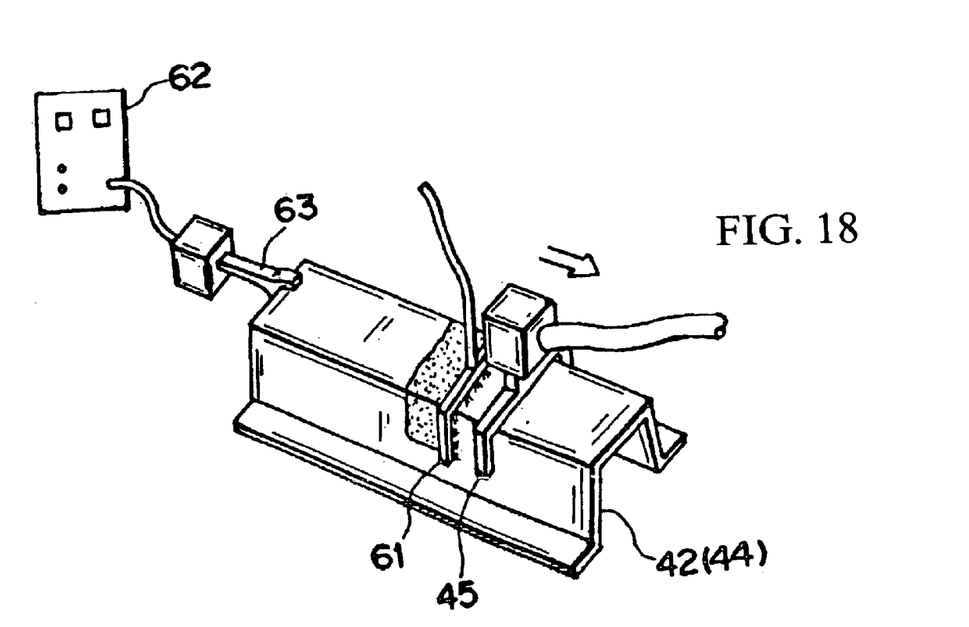
FIG. 18 is a perspective view illustrating another hardening treatment.

FIG. 18 shows a hardening treatment by a quenching treatment in an open-air atmosphere. This embodiment uses a vibration source 62 and a clip 63 for transmitting vibration generated by the vibration source 62 to the front frame 1, besides the quenching coil 45 for the quenching treatment and a cooling-water supply 61 which are required for the quenching process. With the front frame 11 vibrated by the clip 63 connected to the front frame 11, the coil 45 is energized so as to heat the brittle section 31. Then, the section 31 is cooled by water from the cooling-water supply 61. Here, the quenching treatment (or the hardening treatment) has been completed. The vibration helps the brittle section 31 and its peripheral section be evenly provided with (or exposed to) cooling-water, for ensuring the uniform quenching for brittle section 31 and its peripheral section.

Though the present invention has been described as above with reference to the embodiments, it is intended to include the following alternatives. The hardening treatment shown in FIG. 14 to FIG. 18 may be preformed at any production stage after the workpiece is formed with the brittle section. For example, the treatment may be preformed after the workpiece is processed into the preforms shown in FIG. 6 or FIG. 11, or after the workpiece is processed into the frame shown in FIG. 7 or FIG. 12. Alternatively, the brittle section 31 may be formed and the hardening treatment may be performed after the workpiece is processed into a frame with a final cross-section.

The brittle sections 31, 34 may be provided at desired positions for inducing the buckling. Accordingly, if desired, a plurality of brittle sections may be formed in a frame. To form the brittle sections 31, 34, any method for locally weakening the frame may be applied. For example, a notch may be formed on the frame, apart from providing locally small cross-sectional area or perforations on the frame as described above. Preferably, the brittle sections 31, 34 may be subjected to the hardening treatment together with their peripheral sections, in order to prevent the boundaries between the brittle sections 31, 34 and the other sections from being locally and relatively weakened. The hardening treatment is not limited to the heat treatment like quenching, but may include adequate methods such as a laser-remelt hardening, a laser-quench hardening, and a shot-peening hardening.

In a vehicle with the perimeter frame 24, the brittle section 34 may be omitted from the perimeter frame 24, while the brittle section 31 is formed on the front frame 11. In a vehicle without a perimeter frame 24, the brittle section 31 may be formed only in the front frame 11. The application of the method of the present invention is not limited to the front frame 11, but includes rear frame or other frames, which requires the performance of collision energy absorption.

As described above, in accordance with the present invention, there is provided a body frame structure which induces larger initial load in a collision, and induces the buckling at the predetermined section of the frame at which a brittle section is formed to cause the bending deformation of the frame for effectively absorbing the collision energy with a simple structure. In accordance with the present invention, there is also provided a manufacturing method of the body frame described above.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A body frame structure for a vehicle comprising:

a pair of left and right front frames extending in a vehicle longitudinal direction in front of a passenger compartment of the vehicle, said pair of left and right front frames including first brittle sections which are formed on planar surfaces to end sections on the passenger compartment side of said pair of left and right front frames, said first brittle sections being more brittle than other sections of said pair of left and right front frames and with a smaller cross sectional area than the other sections of said pair of left and right front frames; and a perimeter frame disposed below said pair of left and right front frames, said perimeter frame including a pair of left and right side frames extending in the vehicle longitudinal direction, said pair of left and right side frames including second brittle sections which are formed on planar surfaces adjacent to end sections on the passenger compartment side of said pair of left and right side frames, said second brittle sections being more brittle than other sections of said pair of left and right side frames and with a smaller cross-sectional area than the other sections of said pair of left and right side frames, wherein said first brittle sections and peripheral sections thereof are hardened by a heat treatment so as to become approximately equal to the other sections of said pair of left and right front frames in axial compressive strength, and said second brittle sections and peripheral sections thereof are hardened by a heat treatment so as to become approximately equal to the other sections of said pair of left and right side frames in axial compressive strength.

2. The body frame structure as defined in claim 1, wherein said first brittle sections are comprised of recesses which are formed on planer surfaces of said pair of left and right front frames.

3. The body frame structure as defined in claim 1, wherein said treatment applied to said first and/or second brittle sections and peripheral sections thereof is a quenching and/or a laser-remelt hardening.

4. The body frame structure as defined in claim 1, wherein said first brittle sections are formed at rear sections extending in the vehicle longitudinal direction of said pair of left and right front fames, and said rear sections are approximately constant in cross-sectional area over their length, except for said first brittle sections.

5. The body frame structure as defined in claim 1, wherein said second brittle sections are formed at straight sections extending in the vehicle longitudinal direction of said pair of left and right side frames of said perimeter frame, and said straight sections are approximately constant in cross-sectional area over their length, except for said second brittle sections.

* * * * *